United States Patent
Vanevenhoven

(10) Patent No.: US 12,261,006 B2
(45) Date of Patent: Mar. 25, 2025

(54) MULTI-CONTROLLED CONTACTOR CONTROL

(71) Applicant: Hamilton Sundstrand Corporation, Charlotte, NC (US)

(72) Inventor: Jordan K. Vanevenhoven, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 233 days.

(21) Appl. No.: 18/183,672

(22) Filed: Mar. 14, 2023

(65) Prior Publication Data
US 2024/0312747 A1    Sep. 19, 2024

(51) Int. Cl.
| | | |
|---|---|---|
| H01H 50/54 | (2006.01) | |
| H01H 47/00 | (2006.01) | |
| H02J 3/38 | (2006.01) | |

(52) U.S. Cl.
CPC ........ *H01H 50/546* (2013.01); *H01H 47/002* (2013.01); *H02J 3/38* (2013.01); *H01H 2231/00* (2013.01)

(58) Field of Classification Search
None
See application file for complete search history.

(56) References Cited

U.S. PATENT DOCUMENTS

| | | |
|---|---|---|
| 6,417,701 B1 | 7/2002 | Bolda |
| 6,459,557 B1 | 10/2002 | Haensgen et al. |
| 9,948,110 B2 | 4/2018 | Seagren et al. |
| 10,460,895 B2 | 10/2019 | Pullmann et al. |
| 2005/0017730 A1* | 1/2005 | Schenk ............... H03K 17/6871 324/502 |
| 2020/0274375 A1* | 8/2020 | Griffiths .................... H02J 7/24 |
| 2021/0110986 A1* | 4/2021 | Poisson .................... H03K 3/78 |
| 2022/0399723 A1* | 12/2022 | Polcuch .................... H02J 3/38 |

FOREIGN PATENT DOCUMENTS

DE        10031467 A1    1/2002

OTHER PUBLICATIONS

Abstract of DE10031467 (A1), Published: Jan. 10, 2002, 1 page.
European Search Report for Application No. 24163459.1, mailed Jul. 17, 2024, 5 pages.

* cited by examiner

*Primary Examiner* — Jared Fureman
*Assistant Examiner* — Joel Barnett
(74) *Attorney, Agent, or Firm* — CANTOR COLBURN LLP

(57) ABSTRACT

A contactor system includes a contactor actuator that causes an input bus bar to be electrically connected to an output bus bar and an actuator control element that controls operation of the contactor actuator. The actuator controller includes an input and an output. The system also includes a connection that includes two inputs configured to receive signals from two or more controllers and provide one control signal to the input of the actuator control element and a relay coupled between the output of the actuator control element and ground that disrupts the signal from passing through the actuator control element when commanded by any of the one or more controllers.

18 Claims, 4 Drawing Sheets

MULTI-CONTROLLED CONTACTOR CONTROL

BACKGROUND

The following description relates to controlling electrical contactors and, more particularly, to protecting hardware from erroneous behavior due to software or firmware or controller failures.

Contactor assemblies are used in electrical applications, such as aircraft power distribution systems, where power and current flow control of a multi-phase power distribution system is required. A primary power distribution assembly typically has a panel on which several electrical contactors are mounted.

Each of the contactors is connected to an electrical bus bar and allows current to flow through the contactor and the corresponding bus bar whenever the contactor is in a closed position. The electrical power and current flow through the contactors is controlled by mechanically actuating a contact plate within the contactor such that, when current flow is desired to pass through the contactor, the contact plate is pushed into electrical contact with two leads and forms an electrical path coupling the leads and thereby allowing current to flow through it.

In aerospace electric power generation and distribution systems, electric power is provided from power sources such as generators, Transformer Rectifier Units (TRUs), and batteries to load buses or between load buses via such contactors. These contactors may be controlled by control units such as generator control units or bus power control units. Determination for whether these contactors should be open or closed is performed in controller software or firmware based on a number of inputs such as generator voltage, bus voltage, etc.

In some cases, for redundancy/safety reasons, one or more of the contactors may have a primary controller and a redundant alternate controller which takes over in the event the primary controller is lost due to failure.

BRIEF DESCRIPTION

Disclosed is a contactor system that includes a contactor actuator that causes an input bus bar to be electrically connected to an output bus bar and an actuator control element that controls operation of the contactor actuator. The actuator controller includes an input and an output. The system also includes a connection that includes two inputs configured to receive signals from two or more controllers and provide one control signal to the input of the actuator control element, and a relay coupled between the output of the actuator control element and ground that disrupts the signal from passing through the actuator control element when commanded by any of the one or more controllers.

In addition to one or more of the features described above, or as an alternative to any of the foregoing embodiments, the connection can comprise two diodes that have respective cathodes connected to each other and the cathodes are electrically connected to the input of the actuator control element.

In addition to one or more of the features described above, or as an alternative to any of the foregoing embodiments, the relay can include a normally closed switch and the normally closed switch is connected to the output of the actuator control element.

In addition to one or more of the features described above, or as an alternative to any of the foregoing embodiments, the relay can include a control input and causes the normally closed switch to open when an override signal is provided to it by any of the one or more controllers.

In addition to one or more of the features described above, or as an alternative to any of the foregoing embodiments, the two or more controllers includes a first controller and a second controller that, respectively, include a first override circuit and a second override circuit, wherein the first override circuit generates a first override signal when the first controller determines that the contactor is closed when it should not be and the second override circuit generates a second override signal when the second controller determines that the contactor is closed when it should not be closed.

In addition to one or more of the features described above, or as an alternative to any of the foregoing embodiments, the first controller can determine that the contactor is closed when it should not be based on at least one of: a bus current, a bus voltage, a generator current, a generator voltage, or a contactor status.

In addition to one or more of the features described above, or as an alternative to any of the foregoing embodiments, the input bus bar or the output bus bar can connected to one or more busses. The one or more busses can be fed by TRU's, batteries, or other buses.

In addition to one or more of the features described above, or as an alternative to any of the foregoing embodiments, the controllers can be generator controllers and at least one of the one or busses are connected to a generator.

Also disclosed is a multi-generator control system. The system includes: a first generator controller; a second generator controller; a first bus configured to be driven by a first generator controlled by the first generator controller; a second bus configured to be driven by a second generator controlled by the second generator controller; and a contactor system. The contactor system can include a contactor that is configured to electrically connect or disconnect the first bus to the second bus; an actuator control element that controls operation of the contactor actuator, wherein the actuator controller includes an input and an output; a connection that is connected between the first and second generator controllers and provides one control signal to the input of the actuator control element; and a relay coupled between the output of the actuator control element and ground that disrupts the signal from passing through the actuator control element when commanded by any of the one or more controllers.

In addition to one or more of the features described above, or as an alternative to any of the foregoing embodiments, the connection can comprise two diodes that have respective cathodes connected to each other and the cathodes are electrically connected to the input of the actuator control element.

In addition to one or more of the features described above, or as an alternative to any of the foregoing embodiments, the relay includes a normally closed switch and the normally closed switch is connected to the output of the actuator control element.

In addition to one or more of the features described above, or as an alternative to any of the foregoing embodiments, the relay includes a control input and causes the normally closed switch to open when an override signal is provided to it by any of the one or more controllers.

In addition to one or more of the features described above, or as an alternative to any of the foregoing embodiments, each of the generator controllers includes an override circuit that generates the override signal.

In addition to one or more of the features described above, or as an alternative to any of the foregoing embodiments, the relay generates a status signal and the override circuits generate the override signal when the status signal indicates that the relay is open to lockout the contactor.

In addition to one or more of the features described above, or as an alternative to any of the foregoing embodiments, the first generator controller includes a first override circuit and the second generator includes a second override circuit, wherein the first override circuit generates a first override signal when the first controller determines that the contactor is closed when it should not be and the second override circuit generates a second override signal when the second controller determines that the contactor is closed when it should not be.

In addition to one or more of the features described above, or as an alternative to any of the foregoing embodiments, the first controller or the second controller can determine that the contactor is closed when it should not be based on at least one of: a bus current, a bus voltage, a generator current, a generator voltage, or a contactor status.

BRIEF DESCRIPTION OF THE DRAWINGS

The following descriptions should not be considered limiting in any way. With reference to the accompanying drawings, like elements are numbered alike.

DETAILED DESCRIPTION

While the invention is further discussed below, it has been discovered that in instances where there are redundant controllers that allow for contactor closure when a primary controller is not available, such redundant systems may not account for controller failures which result in the contactor being commanded closed when it should not be. This could result in cascading failure due to inadvertent parallel of sources or overload as a result of controller failure. Herein, a contactor that can be controlled by more than one controller can be referred to as a multi-controlled contactor.

In one embodiment, in the event that the primary or alternate controller determines the contactor is closed when it should not, either controller can independently force open the contactor to open. In one embodiment, the contactor actuator control element (e.g., a coil) has its current return routed through a normally closed relay, which can be energized by either controller. If either controller determines the contactor should be open (due to normal system reconfiguration, inadvertent parallel, overload, etc.), but does not, it will energize the relay. When the relay is energized, the normally closed relay will switch to the open position. This will open the contactor coil return, de-energizing the contactor and opening it even if it is being commanded closed by one of the controllers.

A detailed description of one or more embodiments of the disclosed apparatus and method are presented herein by way of exemplification and not limitation with reference to the Figures.

Figure 1:
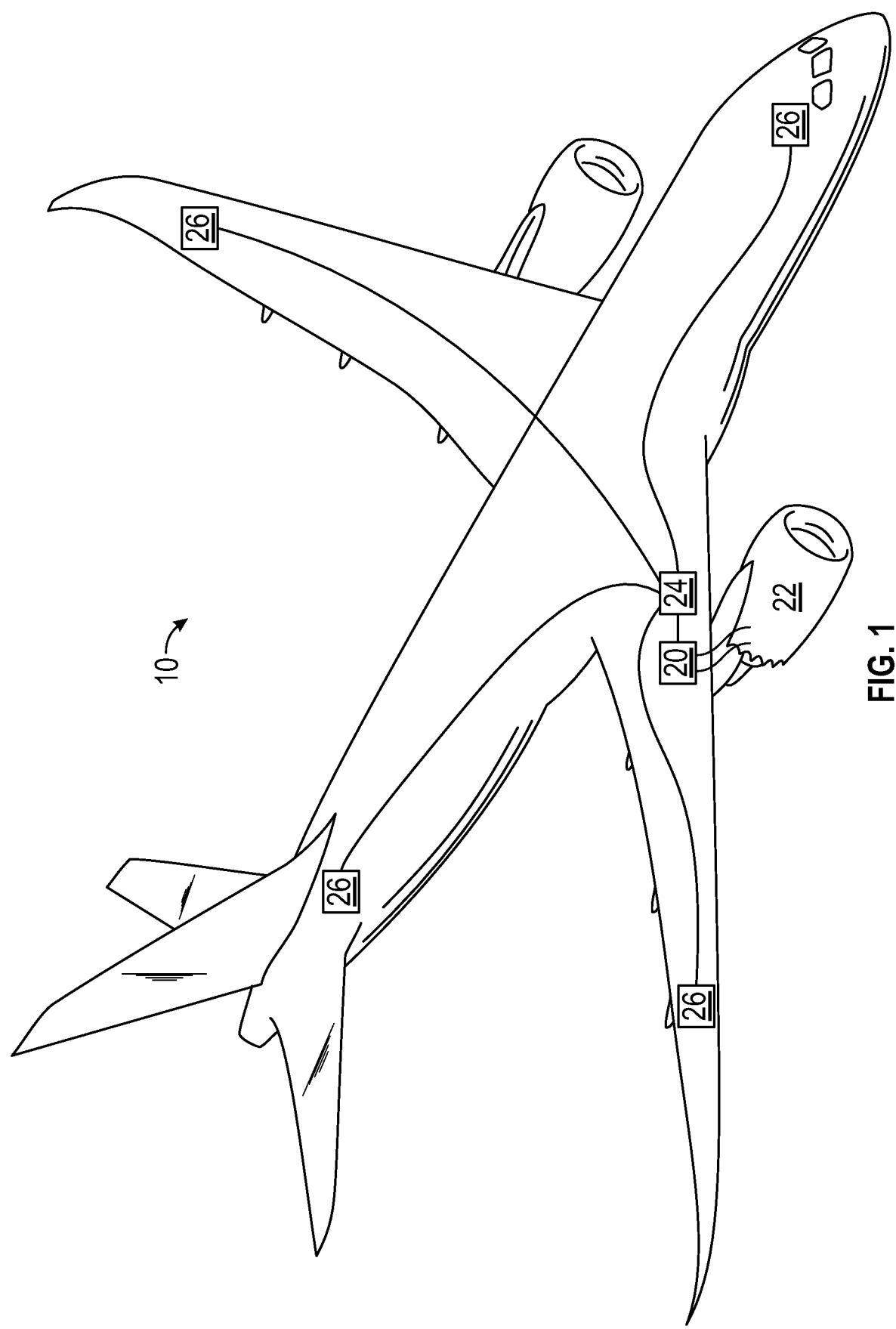
FIG. 1 is a perspective view of an aircraft in accordance with embodiments.

With reference to FIG. 1, an aircraft 10 is provided and includes an electrical power distribution system 20 which utilizes rotation within the jet engines 22 to generate power (e.g., DC or single phase or three phase electrical power). The power is sent to a panel box(s) 24 that contains multiple electrical buses and contactor assemblies for controlling how the power is distributed throughout the aircraft 10. Through the use of the contactor assemblies, power may be controlled for each onboard electrical system 26 independently.

Figure 2:
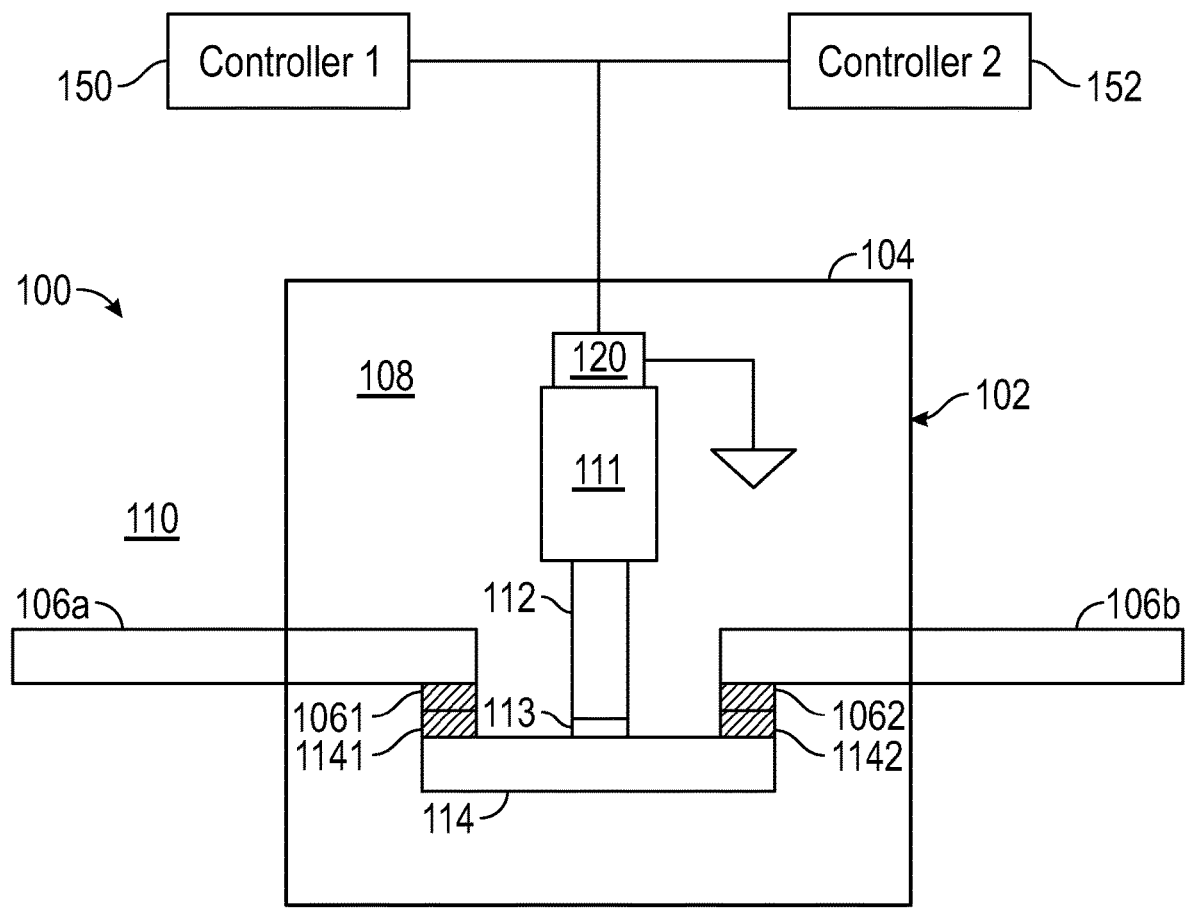
FIG. 2 is block diagram showing a multi-controlled contactor according to one embodiment.

An exemplary panel box 24 includes multiple bus bars that can be connected to various aircraft systems by contactor assemblies (or simply contactors). Not by way of limitation but for example only, FIG. 2 shows an example of a contactor assembly 100 of panel box 24 (see FIG. 1). The contactor assembly 100 includes an electrical contactor 102 that in turn includes a housing 104 and bus bars 106a, 106b. The housing 104 is formed to define an interior 108 and the bus bars 106 extend into the interior 108 from an exterior 110 of the housing 104. As discussed in greater detail below, the bus bars may be connected to two different power busses and, when the contactor 102 is closed, can join the power buses. Of course, this is not meant as limiting and contactor can join any two elements such as other busses, sources, panels, batteries, etc.

The contactor assembly 100 further includes a contactor actuator 111 that can be, for example, a solenoid, a plunger 112 with an insulator 113 at a distal end thereof and a movable bus bar 114. The actuator 111 can be associated with, in some instances, an actuator control element 120 that can be, in one embodiment, a coil. When the actuator control element 120 is energized, the actuator 111 will cause the contactor assembly 100 to "close" and electrically connect the bus bars 106a, 106b. The bus bars 106a, 106b can be referred to as input and output bus bars herein. As more fully discussed below, the actuator control element 120 can be energized by one or more controllers 150, 152.

As shown, the actuator control element 120 is connected between the controllers 150, 152 and ground. This allows a current to pass through the actuator control element 120 and, thus, causes the contactor actuator 111 to cause the plunger 112 to move.

At a central portion thereof, the movable bus bar 114 is coupled to the plunger 112 via the insulator 113. At opposite ends thereof, the movable bus bar 114 includes contact pads 1141. The movable bus bar 114 is movable by the contactor actuator 111 into a first position and a second position depending on whether the actuator control element 120 is energized.

At the first position, the contact pads 1141 of the movable bus bar 114 contact the stationary contact pads 1061 and 1062 such that the corresponding bus bars 106 are electrically coupled with one another. At the second position, the contact pads 1141, 1142 are displaced from the stationary contact pads 1061 and 1062 such that the corresponding bus bars 106 are decoupled from one another.

Thus, in operation, the electrical contactor 102 is operable in a first mode or in a second mode. In the first mode, corresponding bus bars 106a, 106b are electrically coupled with each other in the interior 108 of the housing 104. In the second mode, the corresponding bus bars 106a, 106b are electrically decoupled from one another in the interior 108 of the housing 104.

Examples of the controllers 150, 152, etc. can include, without limitation, a GCU (generator control unit) A GCU controls the voltage output of the AC generator for the system. There are typically multiple generators (at least one per engine) on aircraft for redundancy.

Figure 3:
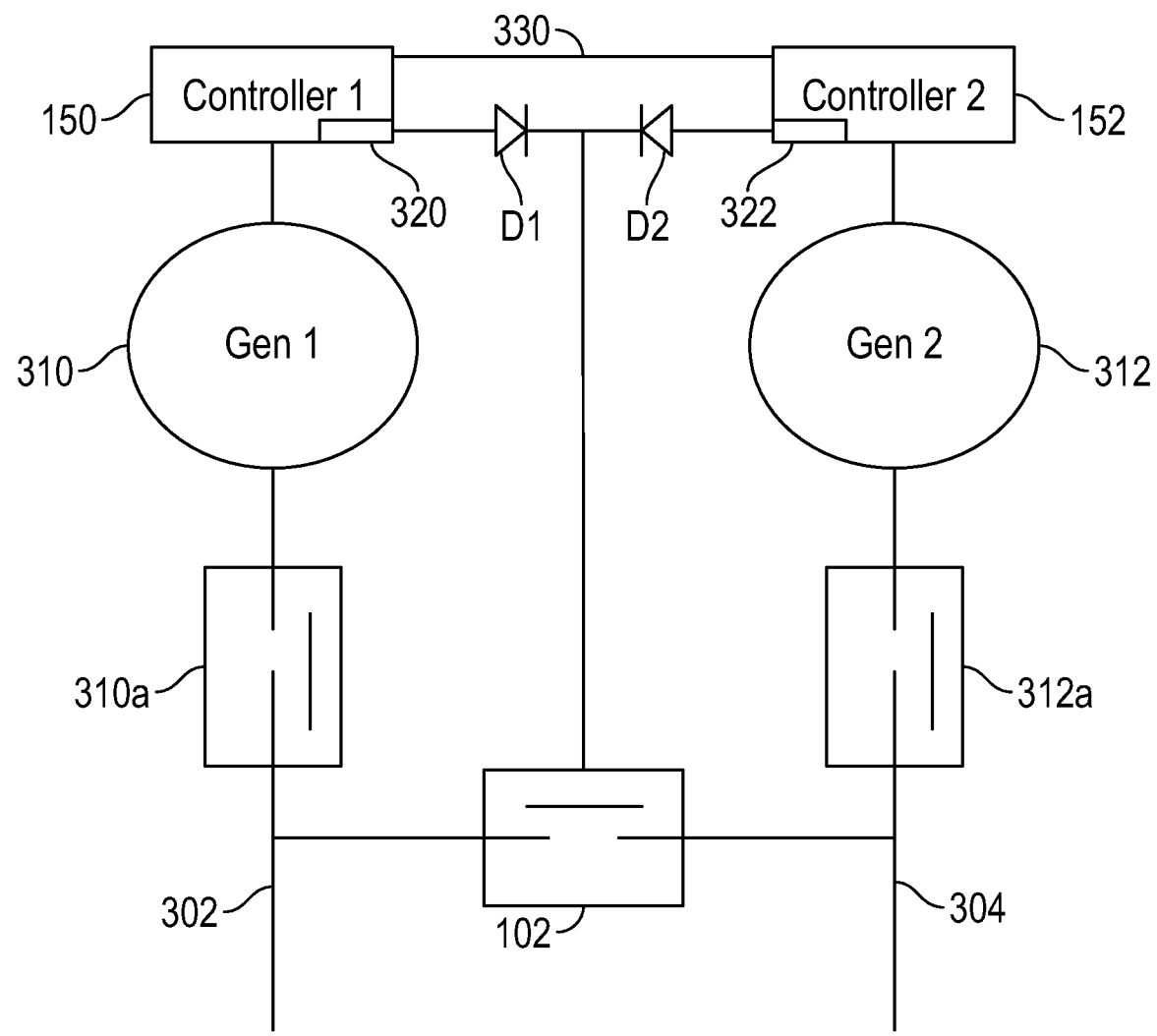
FIG. 3 shows a system that includes two generators that drive two busses and that includes multi-controlled contactor that connects the busses.

FIG. 3 shows an example where first and second controllers 150, 152 can both control a contactor (e.g., contactor 102). In FIG. 3, there are two busses 302, 304. These two busses can be each individually driven by a separate generator. For instance, the first bus 302 can be driven by a first generator 310 and the second bus 304 can be driven by second generator 312. In some cases, the busses can be joined. In such a case, the contactor 102 can be bus connection contactor.

The generators 310, 312 can be AC generators. The output can be rectified such that the output is DC if desired. Depending on the output, the first and second busses can either be AC or DC busses.

As shown, each generator 310, 312 has its own associated controller 150, 152 connected to it. These controllers can be generator controllers and can communicate with one another (optionally) by a comm line 330. In one example, the comm line carries an inhibit signal.

Each of the controllers 150, 152 includes a respective driver circuit 320, 322. These drivers can each generate an actuator control signal. This signal can be for example, provided as a voltage that can be used to drive an actuator control element 120 (FIG. 2). For example, the driver circuits 320, 322 can deliver from 15-30V to the contactor 102 to cause it to close. In particular, the power is provided to the actuator control element 120 and this in turn, cause the contactor 102 to close.

As shown, the driver circuits 320, 322 are diode connected to one another by diodes D1, D2. In particular, the illustrated system, the cathodes of D1 and D2 connected to each other and the anodes of D1 and D2 connected to respective driver circuits 320, 322. As will be understood, if either or both of the driver circuits 320, 322 is delivering a voltage, that voltage will be provided to the actuator control element 120 of FIG. 2 and cause the contactor to enter the first mode.

As will be understood, the configuration shown in FIG. 3 allows for the contactor 102 to be controller by either or both the first or second controllers 150, 152. In the system of FIG. 3, each generator 310, 312 can be connected or disconnected from its associated bus 302, 304 by generator contactors 310a, 312a that are controller by the associated controllers 150, 152.

By way of non-limiting example, consider the case where the first generator 310 is not operating properly. In such a case, in typical operation, the first controller 150 would cause the first generator contactor 310a to open and remove the first generator 310 from the system. In such a case, the second controller 152 would cause the bus connection contactor 102 to close and the second generator 312 could supply power to both the first and second busses 302, 304.

However, in some cases, first controller 150 may not open in the first generator contactor 310a and may still command the bus connection contactor 102 closed. In such a case, there is no way to open the bus connection contactor 102. This can lead to the second generator 312 feeding power back into the first generator 310. This can result in damage to the first generator 310 and/or overload the second generator 312 causing it to trip offline resulting in loss of all normal power. It shall be understood that the above discussion was provided by way of example only and embodiments of the current disclosure can be utilized in any situation where one controller is erroneously causing a dual (or more) controlled contactor to be closed.

In one embodiment, the disclosure herein allows any controller of a multi-controlled contactor to force the contactor open if it determines the contactor is closed when it should not be. Such a determination can be made, for example, based on source (generator, TRU, battery, etc.) or bus voltages, currents and contactor status. The following description will be implemented in the case as described in FIG. 3 but that it is not limited to that situation.

Figure 4:
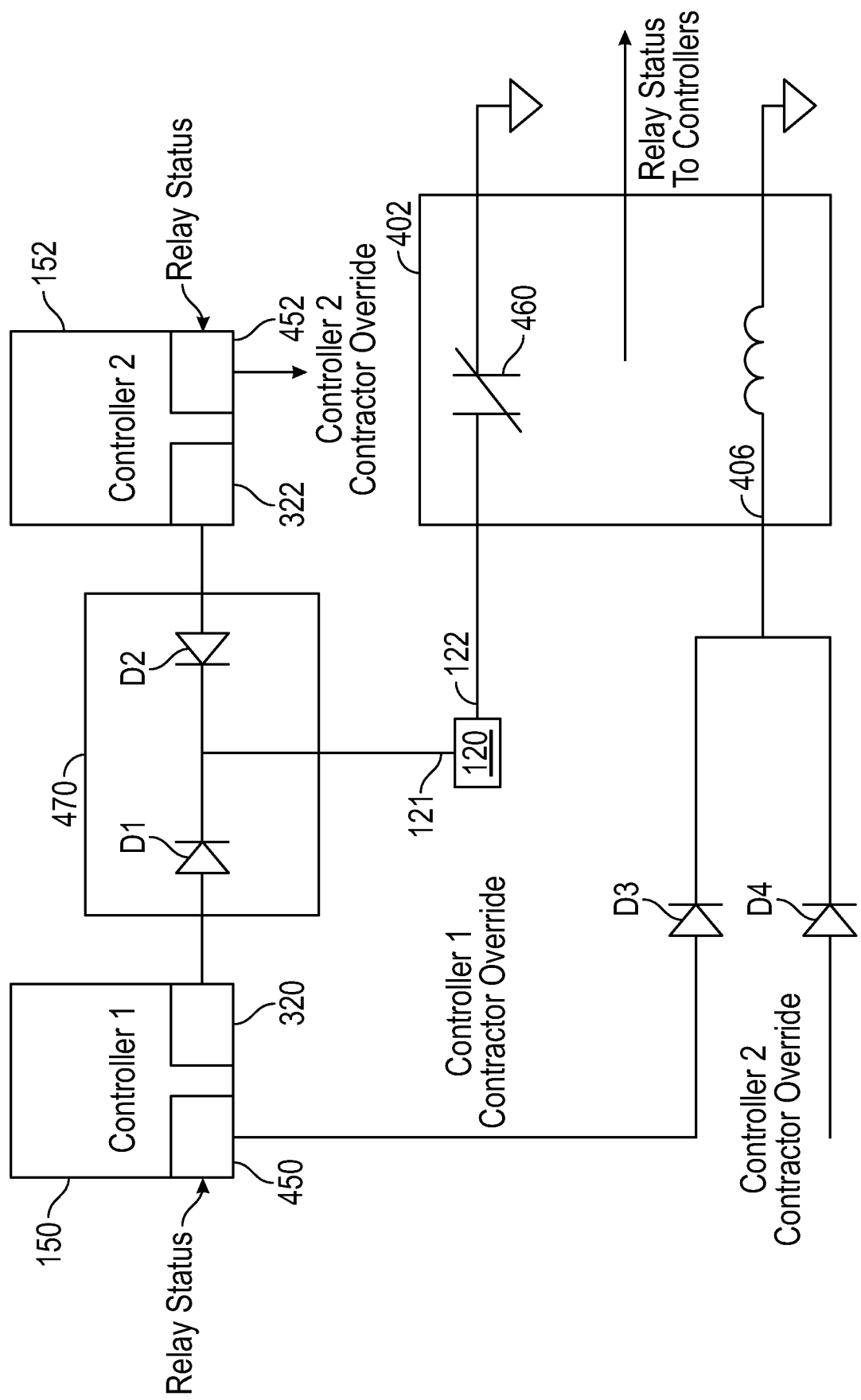
FIG. 4 shows the multi-controlled contactor of FIG. 3 in more detail and allows one or both of the controllers to disconnect the contactor by disrupting the return path of an actuator control element that is used to control the contactor.

As shown in FIG. 4, the contactor 102 includes an actuator control element 120. The actuator control element 120 can be a coil in one embodiment and it can control the contactor 102 of FIG. 3. The actuator control element 120 includes an input 121 and an output. The output 122 is connected to a normally closed relay 402. This relay can disrupt the return path of the actuator control element 120 when opened. In more detail, when one of the controllers 150, 152 determines the actuator control element 120 should not be energized, it can generate a controller override signal that will cause the relay to open.

Each of the controllers 150, 152 includes a respective driver circuit 320, 322. This circuit can provide, for example, a voltage that can be used to drive the actuator control element 120. For example, the driver circuits 320, 322 can deliver from 15-30V actuator control element 120 to cause its associated contactor (e.g., contactor 102, to close. The path through which power can be provided by the controllers 150, 152 is generally shown by connection 470 and can connect two or more controllers to an input 121 of the actuator control element 120.

As shown, the driver circuits 320, 322 are diode connected to one another by diodes D1, D2. In particular, the illustrated diode connection has the cathodes of D1 and D2 connected to each other and the anodes of D1 and D2 connected to respective driver circuits 320, 322. The cathodes of D1 and D2 are both electrically connected to the input 121 of the actuator control element 120. As will be understood, if either or both of the driver circuits 320, 322 is delivering a voltage, that voltage will be provided to the input 121 of the actuator control element 120 and cause the contactor to enter the first mode.

Each of the controllers 150, 152 can also include an override circuit 450, 452. This circuit can be similar to the driver circuits 320, 322. These circuits can be based on a desired status of the contactor, disrupt the return path of the actuator control element 120.

In more detail, each of the controllers 150, 152 receives a relay status signal from the relay 402. Each controller may receive a separate status. This signal will indicate whether the relay 402 is opened or closed. The controllers 150, 152 will determine if the contactor should be closed. If it should not be, and the status signal from the relay 402 indicates that the relay is closed, then one or both of the override circuits 450, 452 will generate a signal. That signal will be provided to the control input 406 of the relay 402 and cause the normally closed switch 460 to open. This will in turn, cause current to cease to flow through the actuator control element 120 regardless of the signal provided by the driver circuits 320, 322. As shown, the normally closed switch 460 is connected to an output of the actuator control element 120 on one side and the other side can be connected to a reference potential (e.g., ground). In this manner, the switch 460 can disrupt the return path through actuator control element 120. If the status signal from the relay 402 indicates that the relay is opened, then both of the override circuits 450, 452 will generate a signal. That signal will be provided to the control input 406 of the relay 402 and cause the normally closed switch 460 to open. This will cause both controllers to lockout the contactor 102 to prevent improper behavior of one controller from closing the contactor 102.

As shown, the first override circuit 450 is connected to an provides a controller 1 contactor override signal to D3 and the second override circuit 452 is connected to an provides a controller 2 contactor override signal to D4. In the event either signal is "high" the diodes will pass the signal to the input 406 and cause the normally closed switch 460 to open.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A contactor system comprising:
    a contactor actuator that causes an input bus bar to be electrically connected to an output bus bar;
    an actuator control element that controls operation of the contactor actuator, wherein the actuator controller includes an input and an output;
    a connection that includes two inputs configured to receive signals from two or more controllers and provide one control signal to the input of the actuator control element; and
    a relay coupled between the output of the actuator control element and ground that disrupts the signal from passing through the actuator control element when commanded by any of the one or more controllers.

2. The contactor system of claim 1, wherein the connection comprises two diodes that have respective cathodes connected to each other and the cathodes are electrically connected to the input of the actuator control element.

3. The contactor system of claim 1, wherein the relay includes a normally closed switch and the normally closed switch is connected to the output of the actuator control element.

4. The contactor system of claim 3, wherein the relay includes a control input and causes the normally closed switch to open when an override signal is provided to it by any of the one or more controllers.

5. The contactor system of claim 4, wherein the two or more controllers include a first controller and a second controller that, respectively, include a first override circuit and a second override circuit, wherein the first override circuit generates a first override signal when the first controller determines that the contactor is closed when it should not be and the second override circuit generates a second override signal when the second controller determines that the contactor is closed when it should not be.

6. The contactor system of claim 5, wherein the relay generates a status signal and the override circuits generate the override signal when the status signal indicates that the relay is open.

7. The contactor system of claim 5, wherein the first controller or the second controller can determine that the contactor is closed when it should not be based on at least one of: a bus current, a bus voltage, a generator current, a generator voltage, or a contactor status.

8. The contactor system of claim 1, wherein the input bus bar or the output bus bar are connected to one or more busses.

9. The contactor system of claim 8, wherein the one or more busses are fed by TRU's, batteries, or other buses.

10. The contactor system of claim 8, wherein the controllers are generator controllers and at least one of the one or busses are connected to a generator.

11. A multi-generator control system comprising:
    a first generator controller;
    a second generator controller;
    a first bus configured to be driven by a first generator controlled by the first generator controller;
    a second bus configured to be driven by a second generator controlled by the second generator controller; and
    a contactor system that includes:
        a contactor that is configured to electrically connect or disconnect the first bus to the second bus;
        an actuator control element that controls operation of the contactor actuator, wherein the actuator controller includes an input and an output;
        a connection that is connected between the first and second generator controllers and provides one control signal to the input of the actuator control element; and
        a relay coupled between the output of the actuator control element and ground that disrupts the signal from passing through the actuator control element when commanded by the first generator controller or the second generator controller.

12. The multi-generator control system of claim 11, wherein the connection comprises two diodes that have respective cathodes connected to each other and the cathodes are electrically connected to the input of the actuator control element.

13. The multi-generator control system of claim 11, wherein the relay includes a normally closed switch and the normally closed switch is connected to the output of the actuator control element.

14. The multi-generator control system of claim 11, wherein the relay includes a control input and causes the normally closed switch to open when an override signal is provided to it by any of the one or more controllers.

15. The multi-generator control system of claim 14, wherein each of the generator controllers includes an override circuit that generates the override signal.

16. The multi-generator control system of claim 15, wherein the relay generates a status signal and the override circuits generate the override signal when the status signal indicates that the relay is open.

17. The multi-generator control system of claim 14, wherein the first generator controller includes a first override circuit and the second generator includes a second override circuit, wherein the first override circuit generates a first override signal when the first controller determines that the contactor is closed when it should not be and the second override circuit generates a second override signal when the second controller determines that the contactor is closed when it should not be.

18. The contactor system of claim 17, wherein the first controller or the second controller can determine that the contactor is closed when it should not be based on at least one of: a bus current, a bus voltage, a generator current, a generator voltage, or a contactor status.

* * * * *